United States Patent
Stone et al.

(10) Patent No.: US 8,379,654 B2
(45) Date of Patent: *Feb. 19, 2013

(54) METHOD OF AND APPARATUS FOR PROVIDING ISOCHRONOUS SERVICES OVER SWITCHED ETHERNET INCLUDING A HOME NETWORK WALL PLATE HAVING A COMBINED IEEE 1394 AND ETHERNET MODIFIED HUB

(75) Inventors: Glen David Stone, Los Gatos, CA (US); Scott David Smyers, San Jose, CA (US); Bruce Alan Fairman, Woodside, CA (US); Mark Kenneth Eyer, Woodinville, WA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 311 days.

This patent is subject to a terminal disclaimer.

(21) Appl. No.: 12/433,505

(22) Filed: Apr. 30, 2009

(65) Prior Publication Data

US 2009/0210548 A1 Aug. 20, 2009

Related U.S. Application Data

(66) Continuation of application No. 10/082,637, filed on Feb. 22, 2002, now Pat. No. 7,542,474, Substitute for application No. 60/271,858, filed on Feb. 26, 2001.

(51) Int. Cl.
*H04L 12/46* (2006.01)
(52) U.S. Cl. .................. 370/401; 370/444; 370/468
(58) Field of Classification Search .................. 370/347, 370/400–402, 419, 437, 444, 447, 461, 465, 370/468; 710/309–315; 725/74, 78, 89, 725/141, 153; 709/230–231, 246, 249
See application file for complete search history.

(56) References Cited

U.S. PATENT DOCUMENTS

| | | | |
|---|---|---|---|
| 2,386,753 A | 10/1945 | Shield | |
| 2,603,684 A | 7/1952 | Holmes | |
| 3,785,432 A | 1/1974 | Kabat et al. | |
| 4,376,920 A | 3/1983 | Smith | |
| 4,604,689 A | 8/1986 | Burger | |
| 4,761,519 A | 8/1988 | Olson et al. | |
| 4,763,360 A | 8/1988 | Daniels et al. | |
| 4,822,304 A | 4/1989 | Herron | |
| 4,842,366 A | 6/1989 | Sawada et al. | |
| 4,853,555 A | 8/1989 | Wheat | |
| 4,871,883 A | 10/1989 | Guiol | |

(Continued)

OTHER PUBLICATIONS

Romans et al, "A Medium Access Protocol for Wireless LANs which Support Isochronous and Asynchronous Traffic", IEEE, 1998.*

(Continued)

*Primary Examiner* — Habte Mered
(74) *Attorney, Agent, or Firm* — Haverstock & Owens LLP

(57) ABSTRACT

A combined IEEE 1394-2000 and ethernet network allows devices on the network to operate according to both the IEEE 1394-2000 protocol and the ethernet protocol. The devices within the network are able to send IEEE 1394-2000 isochronous data, IEEE 1394-2000 asynchronous data and ethernet data. Both IEEE 1394-2000 and ethernet devices within the network are coupled to modified hubs (MHubs) to form a local cluster. The MHubs are coupled to an ethernet switch which controls communications between devices in different local clusters. The ethernet switch and the MHubs obey an isochronous interval in which all isochronous data transfers will be allowed. Preferably, on a regular and reoccurring period, the ethernet switch sends an isotick signal to begin the isochronous interval. Any bandwidth left after the isochronous interval is then allocated to the traditional ethernet traffic and the IEEE 1394-2000 asynchronous traffic, until the start of the next isochronous interval.

44 Claims, 9 Drawing Sheets

U.S. PATENT DOCUMENTS

| | | | |
|---|---|---|---|
| 4,881,244 A | 11/1989 | Haug | |
| 4,924,037 A | 5/1990 | Ainsworth et al. | |
| 4,979,185 A | 12/1990 | Bryans et al. | |
| 5,055,064 A | 10/1991 | Imaizumi et al. | |
| 5,077,732 A | 12/1991 | Fischer et al. | |
| 5,133,034 A | 7/1992 | Arroyo et al. | |
| 5,162,609 A | 11/1992 | Adriaenssens et al. | |
| 5,216,202 A | 6/1993 | Yoshida et al. | |
| 5,216,204 A | 6/1993 | Dudek et al. | |
| 5,244,415 A | 9/1993 | Marsillo et al. | |
| 5,341,371 A | 8/1994 | Simpson | |
| 5,362,249 A | 11/1994 | Carter | |
| 5,400,340 A | 3/1995 | Hillman et al. | |
| 5,412,697 A | 5/1995 | Van Brunt et al. | |
| 5,418,478 A | 5/1995 | Van Brunt et al. | |
| 5,450,411 A * | 9/1995 | Heil | 370/352 |
| 5,483,656 A | 1/1996 | Oprescu et al. | |
| 5,485,458 A | 1/1996 | Oprescu et al. | |
| 5,485,488 A | 1/1996 | Van Brunt et al. | |
| 5,493,657 A | 2/1996 | Van Brunt et al. | |
| 5,499,344 A | 3/1996 | Elnashar et al. | |
| 5,504,458 A | 4/1996 | Van Brunt et al. | |
| 5,504,757 A | 4/1996 | Cook et al. | |
| 5,527,996 A | 6/1996 | Ham | |
| 5,533,018 A | 7/1996 | DeJager et al. | |
| 5,572,658 A | 11/1996 | Mohr et al. | |
| 5,574,250 A | 11/1996 | Hardie et al. | |
| 5,579,486 A | 11/1996 | Oprescu et al. | |
| 5,592,510 A | 1/1997 | Van Brunt et al. | |
| 5,615,404 A | 3/1997 | Knoll et al. | |
| 5,617,419 A | 4/1997 | Christensen et al. | |
| 5,619,544 A | 4/1997 | Lewis et al. | |
| 5,623,610 A | 4/1997 | Knoll et al. | |
| 5,636,209 A | 6/1997 | Perlman | |
| 5,664,124 A | 9/1997 | Katz et al. | |
| 5,687,356 A | 11/1997 | Basso et al. | |
| 5,754,548 A | 5/1998 | Hoekstra et al. | |
| 5,774,683 A | 6/1998 | Gulick | |
| 5,781,028 A | 7/1998 | Decuir | |
| 5,796,042 A | 8/1998 | Pope | |
| 5,808,660 A | 9/1998 | Sekine et al. | |
| 5,881,249 A | 3/1999 | Reasoner | |
| 5,945,631 A | 8/1999 | Henrikson | |
| 6,011,784 A | 1/2000 | Brown et al. | |
| 6,032,211 A | 2/2000 | Hewitt | |
| 6,134,625 A * | 10/2000 | Abramson | 710/241 |
| 6,141,355 A * | 10/2000 | Palmer et al. | 370/465 |
| 6,249,528 B1 | 6/2001 | Kothary | |
| 6,304,553 B1 | 10/2001 | Gehman et al. | |
| 6,324,178 B1 | 11/2001 | Lo et al. | |
| 6,339,584 B1 | 1/2002 | Gross et al. | |
| 6,381,647 B1 | 4/2002 | Darnell et al. | |
| 6,434,117 B1 | 8/2002 | Momona | |
| 6,483,846 B1 * | 11/2002 | Huang et al. | 370/445 |
| 6,577,631 B1 | 6/2003 | Keenan et al. | |
| 6,587,453 B1 * | 7/2003 | Romans et al. | 370/347 |
| 6,587,477 B1 | 7/2003 | Takeda et al. | |
| 6,601,127 B1 | 7/2003 | Nomura et al. | |
| 6,611,529 B1 * | 8/2003 | Krishnakumar et al. | 370/437 |
| 6,611,886 B1 | 8/2003 | Lee et al. | |
| 6,643,702 B1 | 11/2003 | Yeung | |
| 6,651,128 B1 | 11/2003 | Gulick | |
| 6,687,264 B1 | 2/2004 | Yoon et al. | |
| 6,690,668 B1 | 2/2004 | Szczepanek et al. | |
| 6,697,372 B1 | 2/2004 | McAlear | |
| 6,704,302 B2 * | 3/2004 | Einbinder et al. | 370/352 |
| 6,745,252 B1 | 6/2004 | Yanagawa et al. | |
| 6,747,979 B1 * | 6/2004 | Banks et al. | 370/401 |
| 6,754,185 B1 | 6/2004 | Banerjee et al. | |
| 6,772,267 B2 * | 8/2004 | Thaler et al. | 710/306 |
| 6,813,651 B1 | 11/2004 | Smith et al. | |
| 6,931,002 B1 | 8/2005 | Simpkins et al. | |
| 6,977,939 B2 | 12/2005 | Joy et al. | |
| 7,006,515 B1 | 2/2006 | Yeung | |
| 7,196,713 B1 | 3/2007 | Yamagishi | |
| 7,275,255 B2 * | 9/2007 | Suda et al. | 725/80 |
| 2001/0037422 A1 | 11/2001 | Thaler et al. | |
| 2001/0043731 A1 | 11/2001 | Ito et al. | |
| 2002/0069417 A1 | 6/2002 | Kliger et al. | |
| 2002/0089994 A1 * | 7/2002 | Leach et al. | 370/412 |
| 2002/0141418 A1 | 10/2002 | Ben-Dor et al. | |
| 2004/0019731 A1 * | 1/2004 | Brown | 710/310 |

OTHER PUBLICATIONS

Lim et al, "Priority Queue-Based IEEE 1394 Device Driver Supporting Real-Time Characteristics", IEEE, 2000.*

"1394 200 Mb/s PHYsical Layer Transceiver," IBM Microelectronics, Product Data Sheet and Application Notes, Version 1.4, Mar. 14, 1996.

"IEEE 1394-1995 Triple Cable Transreceiver/ Arbiter," Texas Instruments, TSB21LV03, Product Preview, Revision 0.99, Mar. 19, 1996.

"P1394 Standard for a High Performance Serial Bus," IEEE P1394 Draft 8.0v2, Jul. 7, 1995.

Tensolite Company product specification, part No. 24443/9B048X-4(LD), Jun. 3, 1993.

Tensolite Company product specification, part No. 24443/9C062X-4(LD), Mar. 17, 1993.

Craig Theorin, "High speed serial links benefit from advanced cabling," Oct. 26, 1995.

Raychem specification control drawing, part No. EPD-RWC-13458, Aug. 7, 1995.

Raychem specification control drawing, part No. 82A0111, Sep. 10, 1995, p. 1 of 2.

Michael Teener et al., "A Bus on a Diet—The Serial Bus Alternative, An Introduction to the P1394 High performance Serial Bus" Apple Computer, Inc. Santa Clara, CA, Pub. Date.: Feb. 24, 1992, pp. 316-321.

"Access to High-Speed LAN via Wireless Media" Software Patent Institute, 1995, 1996.

IEEE Std. 1394a-2000 "IEEE Standard for a High Performance Serial Bus—Amendment 1", Mar. 30, 2000.

"The IEEE-1394 High Speed Serial Bus" by R.H.J. Bloks, pp. 209-216, vol. 50 No. 1/2. 1996.

* cited by examiner

METHOD OF AND APPARATUS FOR PROVIDING ISOCHRONOUS SERVICES OVER SWITCHED ETHERNET INCLUDING A HOME NETWORK WALL PLATE HAVING A COMBINED IEEE 1394 AND ETHERNET MODIFIED HUB

RELATED APPLICATIONS

This Patent Application is a continuation of the U.S. patent application Ser. No. 10/082,637, filed on Feb. 22, 2002 and entitled "A METHOD OF AND APPARATUS FOR PROVIDING ISOCHRONOUS SERVICES OVER SWITCHED ETHERNET INCLUDING A HOME NETWORK WALL PLATE HAVING A COMBINED IEEE 1394 AND ETHERNET MODIFIED HUB. This application claims priority under 35 U.S.C. §119(e) of the co-pending U.S. provisional application Ser. No. 60/271,858 filed Feb. 26, 2001 and entitled "Home Network Wall Plate 1394 And Ethernet Combiner/Splitter." The U.S. patent application Ser. No. 10/082, 637, filed on Feb. 22, 2002 and entitled "A METHOD OF AND APPARATUS FOR PROVIDING ISOCHRONOUS SERVICES OVER SWITCHED ETHERNET INCLUDING A HOME NETWORK WALL PLATE HAVING A COMBINED IEEE 1394 AND ETHERNET MODIFIED HUB and the provisional application Ser. No. 60/271,858 filed on Feb. 26, 2001 and entitled "Home Network Wall Plate 1394 And Ethernet Combiner/Splitter" are also hereby incorporated by reference.

FIELD OF THE INVENTION

The present invention relates to the field of communications between devices within a network configuration operating under multiple protocols. More particularly, the present invention relates to the field of converting and directing communications between devices, operating under different protocols, within a network configuration, including devices operating according to IEEE 1394 protocols and ethernet protocols.

BACKGROUND OF THE INVENTION

The IEEE standard "IEEE 1394-2000 Standard For A High Performance Serial Bus," Draft ratified in 2000, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-2000 serial bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-2000 standard provides a high-speed serial bus for interconnecting digital devices thereby providing a universal I/O connection. The IEEE 1394-2000 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-2000 standard is very thin in size compared to other bulkier cables used to connect such devices. Devices can be added and removed from an IEEE 1394-2000 bus while the bus is active. If a device is so added or removed the bus will then automatically reconfigure itself for transmitting data between the then existing nodes. A node is considered a logical entity with a unique address on the bus structure. Each node provides a configuration ROM, a standardized set of control registers and its own address space. Because of these advantages the IEEE 1394-2000 standard provides for a unique networking structure that is capable of incorporating audio/video devices, media play/record devices, computing devices and display devices.

The IEEE 1394-2000 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-2000 cable. The physical layer 16 also provides arbitration to ensure that all devices coupled to the IEEE 1394-2000 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The transaction layer 12 also provides a path for isochronous management data to be transferred to the serial bus management block 10 via read operations with isochronous control compare-swap registers. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

A diverse range of products can be implemented with the ability to connect to an IEEE 1394-2000 serial bus network. These devices can have capabilities and functionality ranging from very simple to very complex. Specifically, a variety of audio/video devices, media play/record devices and computing/display devices are capable of being linked together over an IEEE 1394-2000 serial bus networking structure to support asynchronous and isochronous data transfers between the devices.

The IEEE 1394-2000 cable environment is a network of nodes connected by point-to-point links, including a port on each node's physical connection and the cable between them. The physical topology for the cable environment of an IEEE 1394-2000 serial bus is a non-cyclic network of multiple ports, with finite branches. The primary restriction on the cable environment is that nodes must be connected together without forming any closed loops.

The IEEE 1394-2000 cable connects ports together on different nodes. Each port includes terminators, transceivers and simple logic. A node can have multiple ports at its physical connection. The cable and ports act as bus repeaters between the nodes to simulate a single logical bus. Because each node must continuously repeat bus signals, a pair of power wires within the cable including a power wire VP and a ground wire VG, enable the physical layer of each node to remain operational even when the local power at the node is turned off. The pair of power wires is powered from local power of the active devices on the IEEE 1394-2000 serial bus. Accordingly, at least one of the active devices must be powered by local power. Together, the signals VG and VP form a power signal which is used by the nodes.

The cable physical connection at each node includes one or more ports, arbitration logic, a resynchronizer and an encoder. Each of the ports provide the cable media interface into which the cable connector is connected. The standard IEEE 1394-2000 cable connectors, used at both ends of the IEEE 1394-2000 cable provide six electrical contacts plus a shield. The six electrical contacts represent two contacts for each of the differential signals TPA and TPB, and a single contact each for the power signal VP and the ground signal VG. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394-2000 serial bus. Using these components, the cable physical connection translates the point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

There are network configurations and protocols other than IEEE 1394-2000 which are used to connect devices together. One such configuration and protocol is a local area network (LAN) operating according to Ethernet standards, such as the Institute of Electrical and Electronics Engineers (IEEE) 802.3 standard. Within a LAN, a multi-port router allows simultaneous communication between nodes of the LAN by segmenting the LAN into multiple network segments, each segment having a corresponding transmission medium. When a node (source node) sends data to another node (destination node) located on its same segment of the LAN (intra-segment communication), the data is communicated directly between the nodes without intervention by the multi-port router and is known as an intra-segment packet. Therefore, when the multi-port router receives an intra-segment packet, the multi-port router does not bridge the packet (the packet is filtered). When a node (source node) sends a data packet to another node (destination node) located on a different segment (inter-segment communication), the multi-port router appropriately forwards the data packet to the destination node.

Ethernet technology currently appears to be the leading technology for implementing home networks. The Ethernet standards support asynchronous data transfers which take place as soon as possible, based on a contention mechanism, and transfer an amount of data from a source node to a destination node. However, the Ethernet standards do not support isochronous data transfers or guaranteed bandwidth delivery.

SUMMARY OF THE INVENTION

A combined IEEE 1394-2000 and ethernet network allows devices on the network to operate according to both the IEEE 1394-2000 protocol and the ethernet protocol. The devices within the network are able to send IEEE 1394-2000 isochronous data, IEEE 1394-2000 asynchronous data and ethernet data. Both IEEE 1394-2000 and ethernet devices within the network are coupled to modified hubs (MHubs) to form a local cluster. The MHubs are coupled to an ethernet switch which controls communications between devices in different local clusters. The ethernet switch and the MHubs obey an isochronous interval in which all isochronous data transfers will be allowed. Preferably, on a regular and reoccurring period, the ethernet switch sends an isotick signal to begin the isochronous interval. Alternatively, clocks at all nodes within the network are synchronized to start and stop the isochronous interval at the same time without the need for any one device to transmit the isotick signal. Any bandwidth left after the isochronous interval is then allocated to the traditional ethernet traffic and the IEEE 1394-2000 asynchronous traffic, until the start of the next isochronous interval.

In one aspect of the present invention, a method of transmitting data within a network including one or more of a first type of device operating according to a first protocol and a second protocol and one or more of a second type of device operating according to only the second protocol comprises establishing a periodic cycle including a first portion and a second portions allowing only transmissions according to the first protocol during the first portion and allowing only transmissions according to the second protocol during the second portion. The devices of the first type and devices of the second type communicate with each other within the network. The method further comprises converting the transmissions into a format understood by a receiving device. A duration of the first portion is dependent on a number of active streams of the first protocol within the network. The method further comprises establishing an active stream of the first protocol within the network and guaranteeing first protocol bandwidth to the active stream. Preferably, the first type of device operates according to IEEE 1394 protocol and the second type of device operates according to ethernet protocol. Preferably, the first protocol is isochronous capable and the second protocol is asynchronous.

In another aspect of the present invention, a modified hub device configured for coupling between two or more devices operating according to two or more different protocols and a switching device, the hub device comprises a first interface configured for coupling to and communicating with one or more of a first type of device operating according to a first protocol and a second protocol, a second interface configured for coupling to and communicating with one or more of a second type of device operating according to only the second protocol and a third interface configured for coupling to and communicating with the switching device, wherein the switching device sends a periodic signal which signals the start of a period having a first portion and a second portion, wherein only communications in the first protocol are allowed during the first portion and only communications in the second protocol are allowed during the second portion. Devices of the first type and devices of the second type communicate with each other. The hub device further comprises a conversion circuit coupled to the first interface, the second interface and the third interface for converting transmissions into a format understood by a receiving device. A duration of the first portion is dependent on a number of active streams of the first protocol. The modified hub device communicates with the switching device to establish an active stream involving a device of the first type coupled to the hub device and further wherein appropriate bandwidth for the active stream is guaranteed when the active stream is established. The modified hub device communicates with the switching device to establish an active stream involving a device of the first type coupled to the hub device and to assign a label corresponding to the active stream. Preferably, the first type of device operates according to IEEE 1394 protocol and the second type of device operates according to ethernet protocol. Preferably, the first protocol is isochronous capable and the second protocol is asynchronous. In an alternative embodiment, communications from the first type of device in the second protocol are prioritized during the second portion over communications from the second type of device in the second protocol. In a further alternative embodiment, communications from the second type of device in the second protocol are prioritized during the second portion over communications from the first type of device in the second protocol. The switching device is configured for coupling to a remote network of devices thereby providing a wide area network.

In still another aspect of the present invention, a switching device configured for coupling to two or more hub devices providing interfaces to one or more of a first type of device operating according to a first protocol and a second protocol and one or more of a second type of device operating according to only the second protocol, the switching device comprises a plurality of ports, each port coupled to a corresponding hub device for interfacing with devices coupled to the corresponding hub device and a control circuit coupled to the plurality of ports for sending a periodic signal which signals the start of a period having a first portion and a second portion, wherein only communications in the first protocol are allowed during the first portion and only communications in the second protocol are allowed during the second portion. Devices of the first type and devices of the second type communicate with each other. A duration of the first portion is dependent on a number of active streams of the first protocol. The switching device communicates with the hub devices to establish an active stream involving a device of the first type and further wherein appropriate bandwidth for the active stream is guaranteed when the active stream is established. The switching device communicates with the hub devices to establish an active stream involving a device of the first type and to assign a label corresponding to the active stream. Preferably, the first type of device operates according to IEEE 1394 protocol and the second type of device operates according to ethernet protocol. Preferably, the first protocol is isochronous capable and the second protocol is asynchronous. In an alternative embodiment, communications from the first type of device in the second protocol are prioritized during the second portion over communications from the second type of device in the second protocol. In a further alternative embodiment, communications from the second type of device in the second protocol are prioritized during the second portion over communications from the first type of device in the second protocol. The switching device further comprises a remote interface circuit configured for coupling to a remote network of devices thereby providing a wide area network.

In still a further aspect of the present invention, a network of devices comprises a switching device including a plurality of ports and a control circuit coupled to the plurality of ports for sending a periodic signal which signals the start of a period having a first portion and a second portion, wherein only communications in a first protocol are allowed during the first portion and only communications in a second protocol are allowed during the second portion and a plurality of modified hub devices each including a first interface configured for coupling to and communicating with one or more of a first type of device operating according to the first protocol and the second protocol, a second interface configured for coupling to and communicating with one or more of a second type of device operating according to only the second protocol and a third interface coupled to a corresponding one of the plurality of ports. Devices of the first type and devices of the second type communicate with each other. Each of the modified hub devices further comprise a conversion circuit coupled to the first interface, the second interface and the third interface for converting transmissions into a format understood by a receiving device. A duration of the first portion is dependent on a number of active streams of the first protocol. Each of the modified hub devices communicate with the switching device to establish an active stream involving a device of the first type coupled to the hub device and further wherein appropriate bandwidth for the active stream is guaranteed when the active stream is established. Each of the modified hub devices communicate with the switching device to establish an active stream involving a device of the first type coupled to the hub device and to assign a label corresponding to the active stream. Preferably, the first type of device operates according to IEEE 1394 protocol and the second type of device operates according to ethernet protocol. Preferably, the first protocol is isochronous capable and the second protocol is asynchronous. In an alternative embodiment, communications from the first type of device in the second protocol are prioritized during the second portion over communications from the second type of device in the second protocol. In a further alternative embodiment, communications from the second type of device in the second protocol are prioritized during the second portion over communications from the first type of device in the second protocol. The switching device further comprises a remote interface circuit configured for coupling to a remote network of devices thereby providing a wide area network.

DETAILED DESCRIPTION OF THE PREFERRED EMBODIMENT

A combined IEEE 1394-2000 and ethernet network allows devices on the network to operate according to both the IEEE 1394-2000 protocol and the ethernet protocol. The devices within the network are able to send IEEE 1394-2000 isochronous data, IEEE 1394-2000 asynchronous data and ethernet data. Both IEEE 1394-2000 and ethernet devices within the network are coupled to modified hubs (MHubs) to form a local cluster. The MHubs are coupled to an ethernet switch which controls communications between devices in different local clusters. The MHubs provide an interface between both IEEE 1394-2000 devices and ethernet devices and an ethernet switch. The devices coupled to the MHub within the local cluster provide communications to the MHub directed at other devices within the network. If appropriate, the MHub then forwards those communications to the ethernet switch, at the appropriate time. The MHub also receives communications from the ethernet switch directed to devices coupled to the MHub. The MHub then forwards those communications to the target device within the local cluster, at the appropriate time.

The MHub also preferably provides the appropriate conversions for data transmitted from the MHub, depending on the target device. The MHub preferably converts IEEE 1394-2000 packets to ethernet packets and ethernet packets to IEEE 1394-2000 packets, as appropriate. The MHub also preferably performs IEEE 1394-2000 and ethernet routing functionality to keep local traffic of devices within the MHub's local cluster isolated from the network, as appropriate, thereby conserving bandwidth through-out the network.

The ethernet switch receives communications from a first MHub on its corresponding port and forwards that communication to a second MHub, representing the target device, on the port corresponding to the second MHub. The ethernet switch and the MHubs obey an isochronous interval in which all isochronous data transfers will be allowed. On a regular and reoccurring period, the ethernet switch sends an isotick signal to begin the isochronous interval. Preferably, this isotick is sent every 125 microseconds by the ethernet switch to the MHubs. Alternatively, clocks at all nodes within the network are synchronized to start and stop the isochronous interval at the same time without the need for any one device to transmit the isotick signal. Any bandwidth left after the isochronous interval is then allocated to the traditional ethernet traffic and the IEEE 1394-2000 asynchronous traffic, until the start of the next isochronous interval. In an alternate embodiment, time critical ethernet traffic is also transmitted during the isochronous interval. In a further alternate embodiment, the asynchronous traffic is prioritized between IEEE 1394-2000 asynchronous traffic and traditional ethernet traffic during the asynchronous period.

Figure 1:
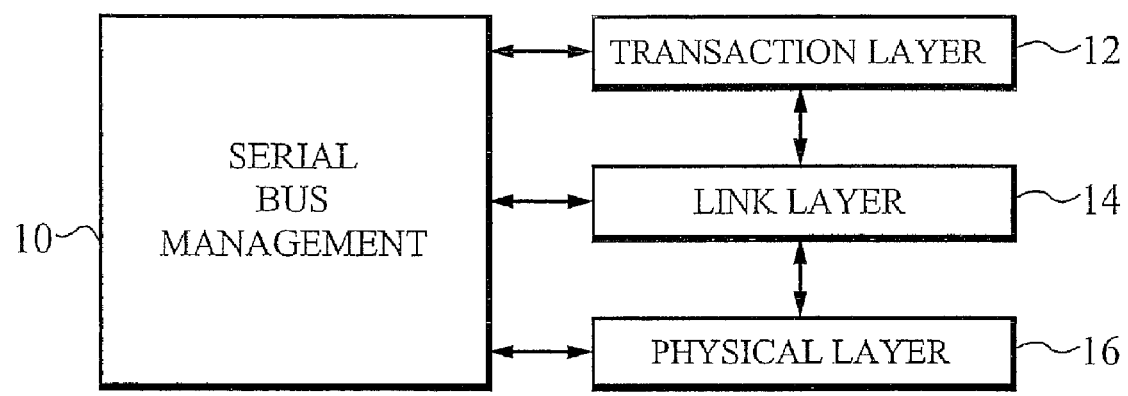
FIG. 1 illustrates a protocol of the IEEE 1394-2000 standard.
Figure 2:
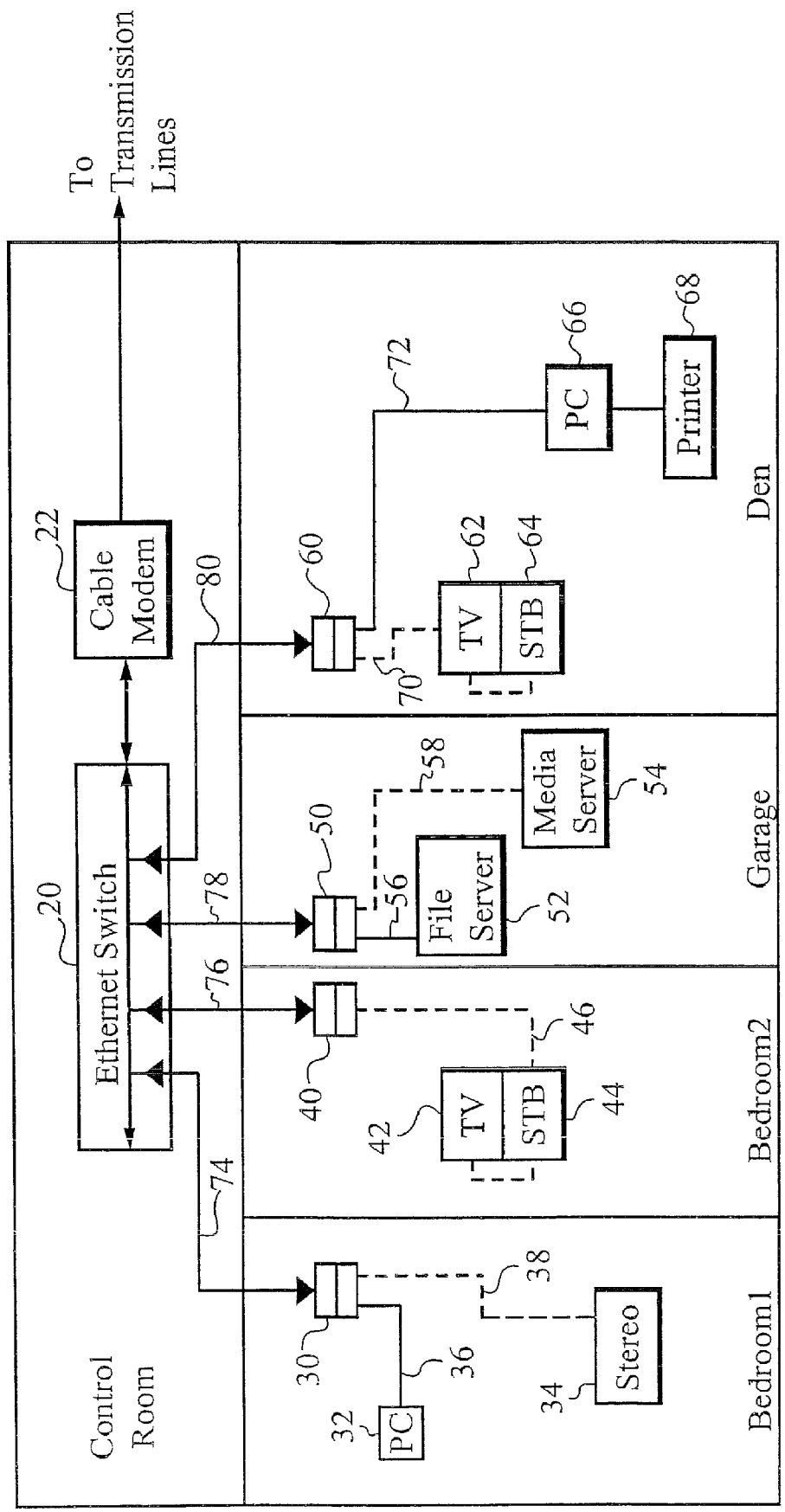
FIG. 2 illustrates a block diagram of an exemplary network according to the present invention.

A block diagram of an exemplary network according to the present invention is illustrated in FIG. 2. This exemplary network is implemented within a house and includes devices that operate according to the IEEE 1394-2000 protocol and devices that operate according to the Ethernet protocol. Within this exemplary network, an ethernet switch 20 and a cable modem 22 are coupled together within a control room. The cable modem 22 is coupled to receive and transmit signals over transmission lines, as is well known by those skilled in the art. The cable modem 22 can be coupled to the internet and/or to a dedicated line to create a wide area network (WAN) with other networks of devices. The ethernet switch 20 is coupled to the remaining devices within the house through the modified hubs (MHubs) 30, 40, 50 and 60 located throughout the house. Both IEEE 1394-2000 and ethernet devices are coupled to the network through the MHubs 30, 40, 50 and 60.

In the first bedroom, a personal computer (PC) 32 is coupled to the MHub 30 by an ethernet cable 36. A stereo 34 is coupled to the MHub 30 by an IEEE 1394-2000 cable 38. The MHub 30 is coupled to the ethernet switch 20 by an ethernet cable 74.

In the second bedroom, a television 42 is coupled to a settop box (STB) 44. The settop box 44 is then coupled to the MHub 40 by an IEEE 1394-2000 cable 46. The MHub 40 is coupled to the ethernet switch 20 by an ethernet cable 76.

In the garage, a file server 52 is coupled to the MHub 50 by an ethernet cable 56. A media server 54 is coupled to the MHub 50 by an IEEE 1394-2000 cable 58. The MHub 50 is coupled to the ethernet switch 20 by an ethernet cable 78.

In the den, a settop box 64 is coupled to a television 62. The television 62 is then coupled to the MHub 60 by an IEEE 1394-2000 cable 70. A printer 68 is coupled to a PC 66. The PC 66 is coupled to the MHub 60 by an ethernet cable 72. The MHub 60 is coupled to the ethernet switch 20 by an ethernet cable 80.

As illustrated in FIG. 2, the devices within the house are interconnected using relatively inexpensive and commonly available ethernet and IEEE 1394-2000 technology. The devices are plugged into the MHubs throughout the house. Preferably, the MHubs are capable of coupling to both ethernet and IEEE 1394-2000 devices as will be described in detail below. Preferably, control software according to the present invention is included within the MHubs 30, 40, 50 and 60 and the ethernet switch 20. This control software allows networks, such as the home network illustrated in FIG. 2, to realize and implement both ethernet and IEEE 1394-2000 protocols. In a network according to the present invention, isochronous services can be realized by the IEEE 1394-2000 devices with guaranteed bandwidth available for transmission over both the IEEE 1394-2000 cables and the ethernet cables.

The control software of the present invention within the MHubs 30, 40, 50 and 60 and the ethernet switch 20, manages the bandwidth over the combined network, giving priority to devices that have pre-negotiated isochronous data services. The ethernet switch 20 preferably includes the software that manages the isochronous communications between the MHubs 30, 40, 50 and 60. The ethernet switch 20 and the MHubs 30, 40, 50 and 60 obey an isochronous interval in which all isochronous data transfers will be allowed. Any bandwidth left after the isochronous interval is then allocated to the traditional ethernet traffic and the asynchronous IEEE 1394-2000 traffic, until the start of the next isochronous interval. The isochronous interval is preferably a regular and reoccurring event much like the IEEE 1394-2000 cycle start signal. In an alternate embodiment, time critical ethernet traffic is also transmitted during the isochronous interval. In a further alternate embodiment, the asynchronous traffic is prioritized between IEEE 1394-2000 asynchronous traffic and traditional ethernet traffic, during the asynchronous period.

Within the preferred embodiment of the present invention, the isochronous interval is started when the ethernet switch sends an isotick signal to all of the MHubs, notifying the MHubs that it is now okay to send isochronous data. After receiving the isotick signal, the MHubs then send isochronous data for each of the established isochronous channels. After the appropriate data is sent for each of the isochronous streams, the isochronous interval ends and the MHubs are then free to send both asynchronous IEEE 1394-2000 data and ethernet data until the MHubs receive the next isotick signal beginning the next isochronous interval.

Figure 3:
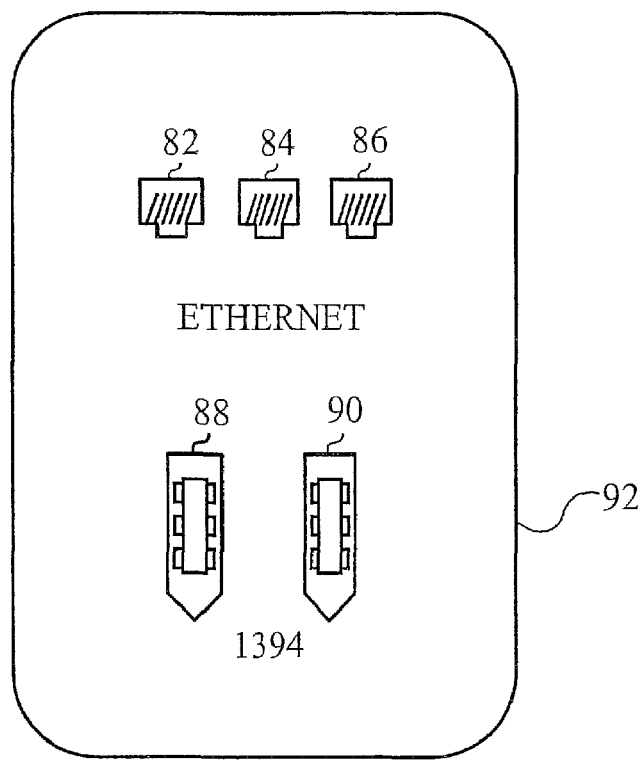
FIG. 3 illustrates a front view of a wall-plate of the preferred embodiment of the present invention.

A front view of a wall plate of the preferred embodiment, is illustrated in FIG. 3. The wall-plate 92 provides the physical interface to the MHubs and includes both IEEE 1394-2000 and ethernet receiving jacks. In the preferred embodiment illustrated in FIG. 3, the wall plate 92 includes the IEEE 1394-2000 receiving jacks 88 and 90 and the ethernet receiving jacks 82, 84 and 86. Alternatively, the wall plate 92 can include any number of IEEE 1394-2000 receiving jacks and ethernet receiving jacks.

Preferably, electronics contained within the MHub convert IEEE 1394-2000 packets to ethernet packets and ethernet packets to IEEE 1394-2000 packets, as appropriate, based on the requirements of the target device. The MHub electronics also preferably convert ethernet and IEEE 1394-2000 packets to the format required by the home network for room to room connections as well as connections to the internet. Preferably, the MHub electronics also contain IEEE 1394-2000 and ethernet bridging functionality to keep local traffic of devices within the room isolated from the home network, thereby conserving bandwidth through-out the home network.

Figure 4:
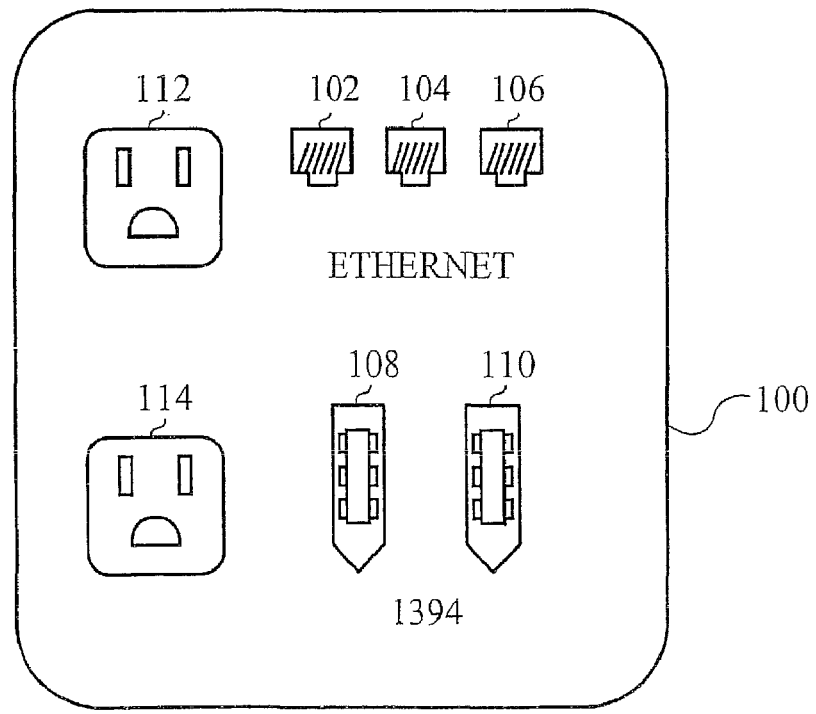
FIG. 4 illustrates a front view of a wall-plate of an alternate embodiment of the present invention.

Electrical power for the MHub electronics is preferably supplied by the backbone connection to the ethernet switch 20. Alternatively, the wall plate is integrated with an electrical power wall plate, as illustrated in FIG. 4. In the wall plate illustrated in FIG. 4, the MHub electronics behind the wall plate receive electrical power from the electrical wires coupled to the electrical power plugs 112 and 114. The electrical power plugs 112 and 114 are coupled to the electrical wires in a conventional manner.

Figure 5:
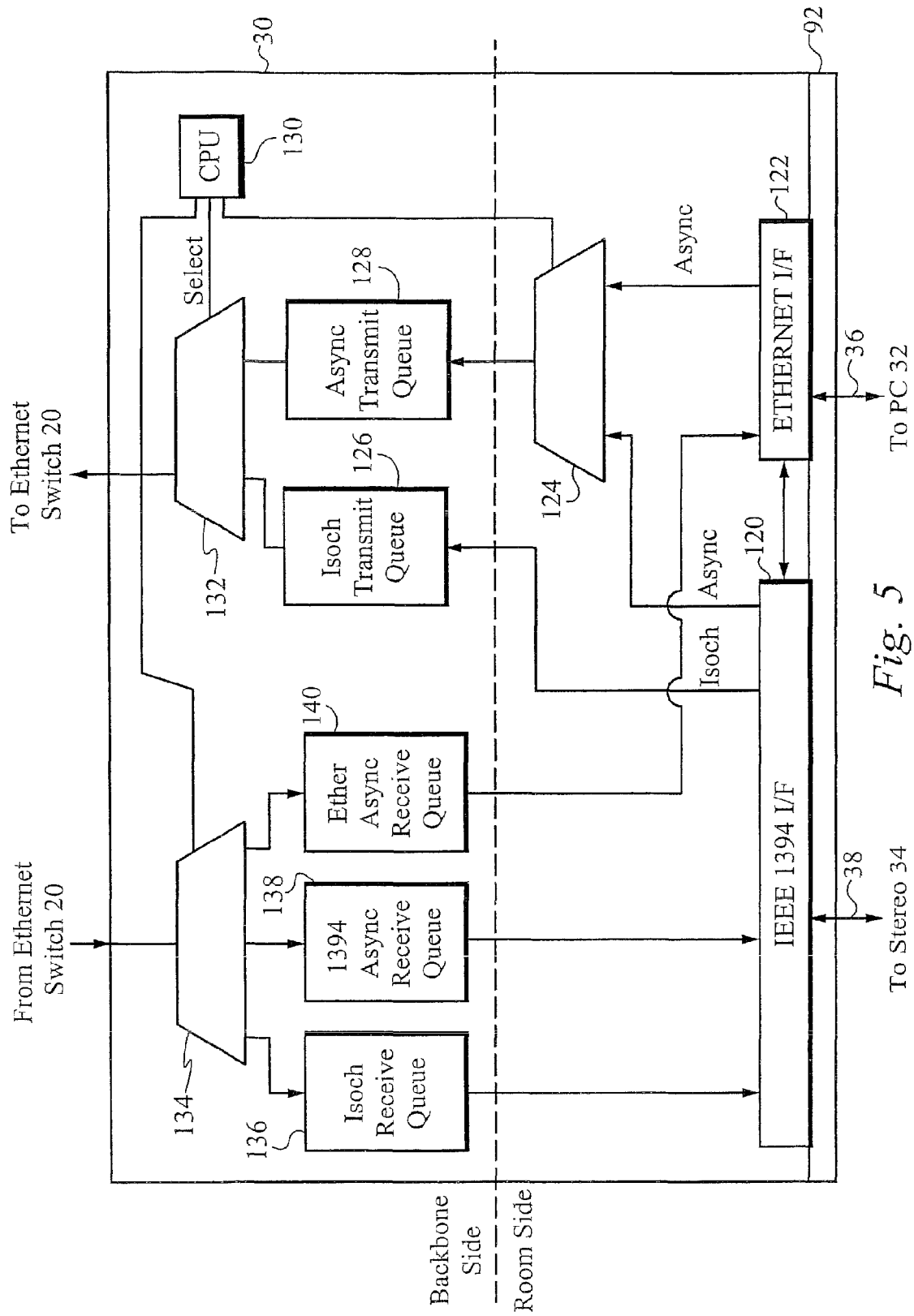
FIG. 5 illustrates a functional block diagram of the electronics within a modified hub (MHub) of the preferred embodiment of the present invention.

A functional block diagram of the electronics within a preferred embodiment of the MHub 30 is illustrated in FIG. 5. The functional block diagram illustrated in FIG. 5 is intended to also be representative of the other MHubs 40, 50 and 60. As described above, the MHub 30 includes the wall plate 92 which provides the physical interface of the connections to the devices coupled to the MHub 30. The MHub 30 includes an IEEE 1394-2000 interface circuit 120 which is coupled to the stereo 34 by the IEEE 1394-2000 cable 38. The MHub includes an ethernet interface circuit 122 which is coupled to the PC 32 by the ethernet cable 36. The IEEE 1394-2000 interface 120 and the ethernet interface 122 are coupled together.

Within the MHub 30, the IEEE 1394-2000 interface circuit 120 is coupled to all isochronous transmit queue 126 to provide isochronous data, received from the stereo 34, to the isochronous transmit queue 126. The IEEE 1394-2000 interface circuit 120 is also coupled to an input of an asynchronous multiplexer circuit 124, to transmit asynchronous data, received from the stereo 34. The IEEE 1394-2000 interface circuit 120 is coupled to receive data from a backbone interface demultiplexer circuit 134. The data received by the IEEE 1394-2000 interface circuit 120 from the backbone interface demultiplexer circuit 134 is both isochronous and asynchronous data. The data received by the IEEE 1394-2000 interface circuit 120 from the backbone interface demultiplexer circuit 134 is data received from the ethernet switch 20 intended for a target device coupled to the IEEE 1394-2000 interface circuit 120. The IEEE 1394-2000 interface circuit 120 is coupled to an isochronous receive queue 136 to receive isochronous data from the backbone interface demultiplexer circuit 134. The IEEE 1394-2000 interface circuit 120 is coupled to an IEEE 1394-2000 asynchronous receive queue 138 to receive IEEE 1394-2000 asynchronous data from the backbone interface demultiplexer circuit 134.

Within the MHub 30, the ethernet interface circuit 122 is coupled to an input of the asynchronous multiplexer circuit 124 to transmit data received from the PC 32. The ethernet interface circuit 122 is also coupled to receive data from the backbone interface demultiplexer circuit 134. The data received by the ethernet interface circuit 122 from the backbone interface demultiplexer circuit 134 is preferably only asynchronous ethernet data. The ethernet interface circuit 122 is coupled to an ethernet asynchronous receive queue 140 to receive ethernet data from the backbone interface demultiplexer circuit 134. The backbone interface demultiplexer circuit 134 is coupled to the ethernet switch 20 by the ethernet cable 74 to provide data from the ethernet switch 20 to the MHub 30 for devices coupled to the ethernet switch 20 The backbone interface demultiplexer circuit 134 is coupled to provide data received from the ethernet switch 20 to the isochronous receive queue 136, the IEEE 1394-2000 asynchronous receive queue 138 and the ethernet asynchronous receive queue 140, as appropriate.

The output of the asynchronous multiplexer circuit 124 is coupled to an asynchronous transmit queue 128 to provide asynchronous data, received from the stereo 34 and from the PC 32, to the asynchronous transmit queue 128. The asynchronous transmit queue 128 and the isochronous transmit queue 126 are both coupled to inputs of a backbone interface multiplexer circuit 132. The output of the backbone interface multiplexer circuit 132 is coupled to the ethernet switch 20 by the ethernet cable 74 to provide data from the MHub 30 to the ethernet switch 20. A CPU 130 is coupled to the backbone interface multiplexer circuit 132, to the backbone interface demultiplexer circuit 134 and to the asynchronous multiplexer circuit 124, to control the output of the data from the MHub 30 to the ethernet switch 20, as will be described in detail below.

Using protocols that will be described below, the MHub of the present invention provides an interface between both IEEE 1394-2000 devices and ethernet devices coupled to the MHub and an ethernet switch. The devices coupled to the MHub provide communications to the MHub directed at other devices within the network. If appropriate, the MHub then forwards those communications to the ethernet switch, at the appropriate time. The MHub also receives communications from the ethernet switch directed to devices coupled to the MHub. The MHub then forwards those communications to the target device, at the appropriate time, providing any conversion necessary to communicate with the target device.

Figure 6:
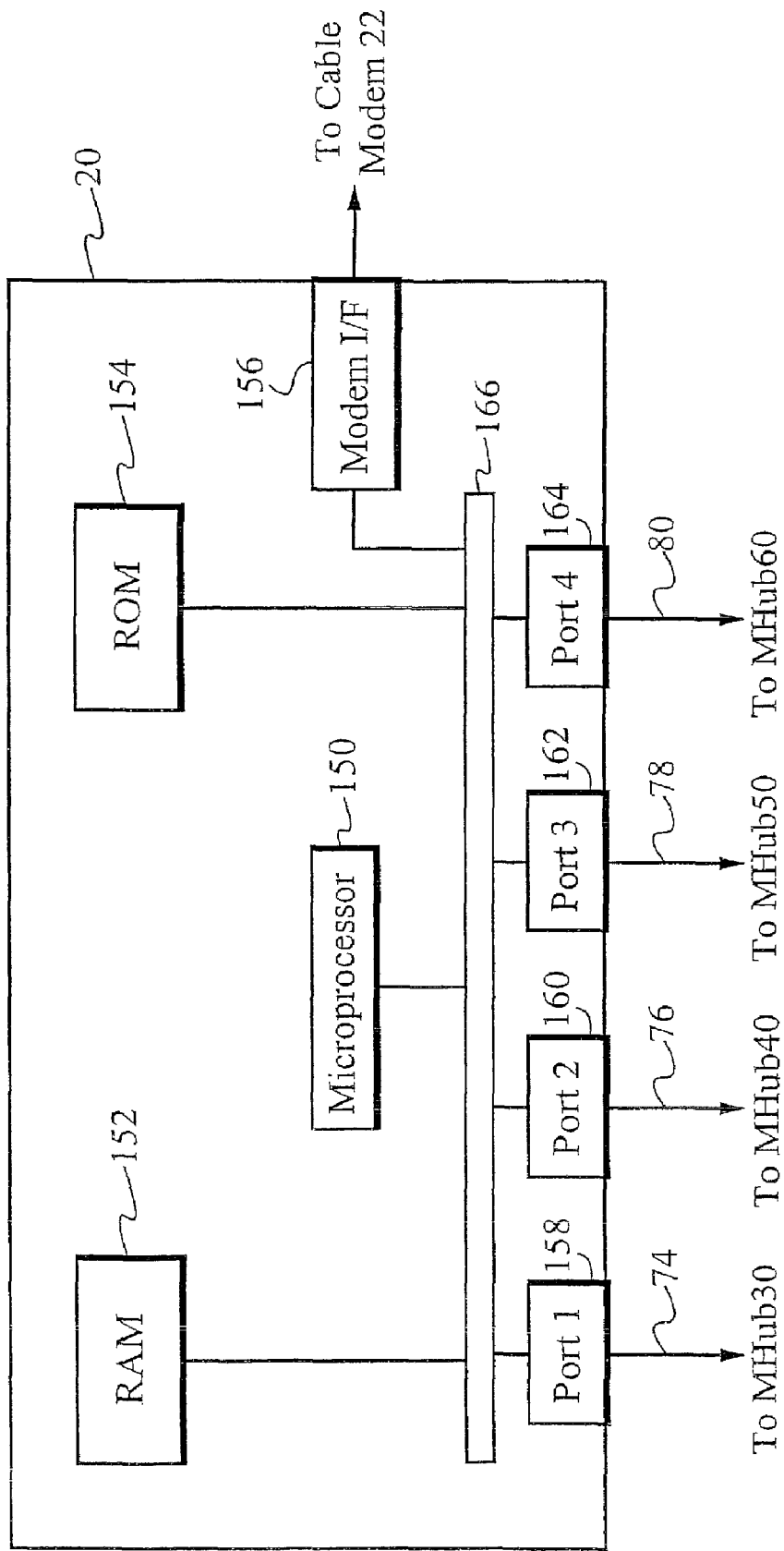
FIG. 6 illustrates a functional block diagram of the electronics within an ethernet switch of the preferred embodiment of the present invention.

A functional block diagram of the electronics within a preferred embodiment of the ethernet switch 20 is illustrated in FIG. 6. The ethernet switch 20 includes the ports 158, 160, 162 and 164, coupled to the MHubs 30, 40, 50 and 60, respectively, by the ethernet cables 74, 76, 78 and 80, respectively. The ethernet switch 20 also includes a modem interface circuit 156 coupled to the cable modem 22. The ethernet switch 20 further includes a microprocessor 150, a random access memory (RAM) 152 and a read only memory (ROM) 154, coupled to the ports 158, 160, 162 and 164 and the modem interface circuit 156 by a system bus 166. Preferably, the ROM 154 includes the control software of the present invention for the ethernet switch 20 run by the microprocessor 150, to control the operation of the ethernet switch 20 and its interaction with the MHubs 30, 40, 50 and 60. The RAM 152 is available for general use by the microprocessor 150 during execution of the software of the present invention and operation of the ethernet switch 20.

Figure 7:
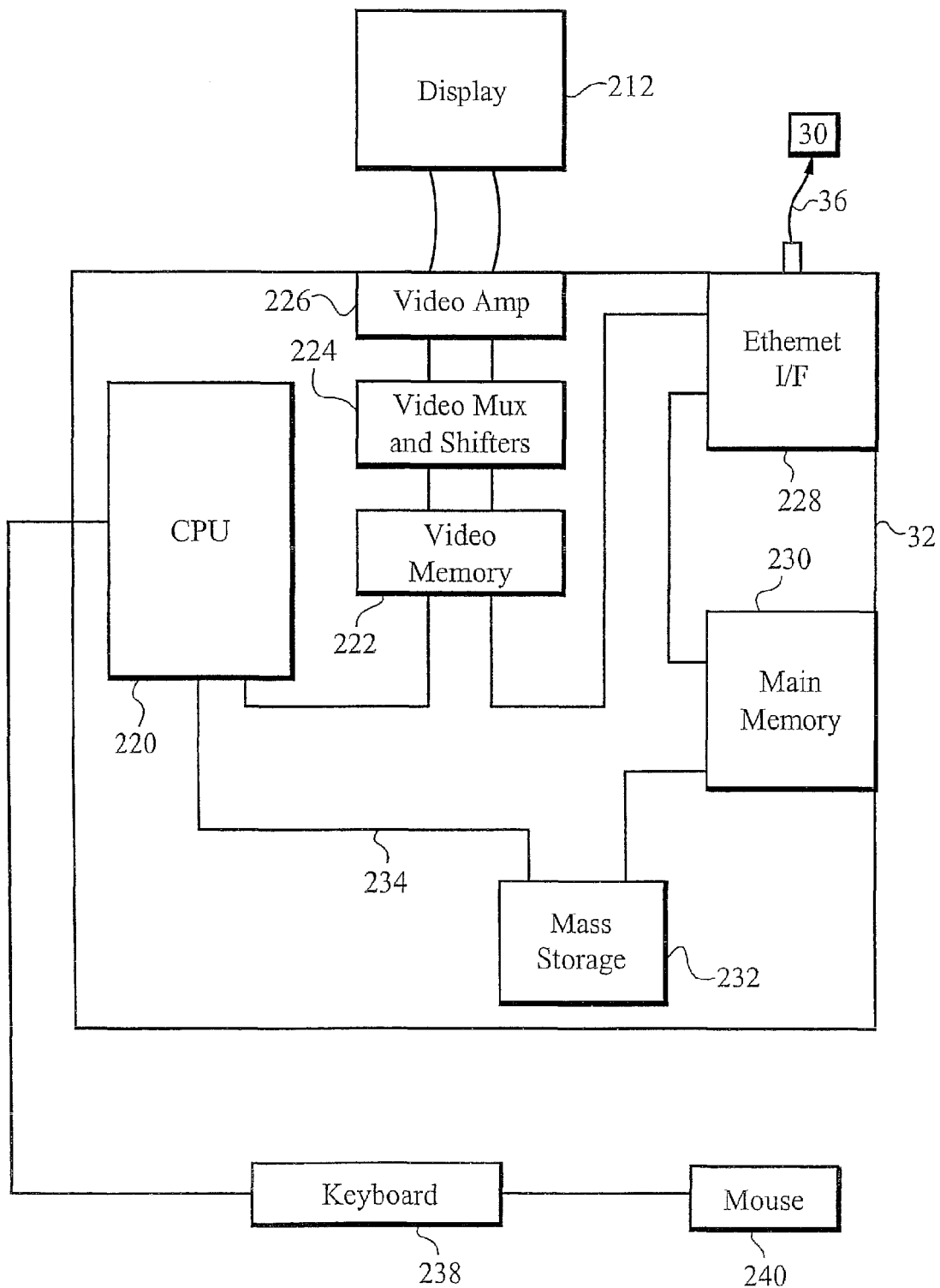
FIG. 7 illustrates a block diagram of the internal components of the PC 32.

A block diagram of the internal components of the PC 32 is illustrated in FIG. 7. The PC 32 includes a central processor unit (CPU) 220, a main memory 230, a video memory 222, a mass storage device 232 and an ethernet interface circuit 228, all coupled together by a conventional bidirectional system bus 234. The interface circuit 228 includes the physical interface circuit for sending and receiving communications over the ethernet cable 36 to the MHub 30. The interface circuit 228 is coupled to the MHub 30 by the ethernet cable 36. In the preferred embodiment of the present invention, the interface circuit 228 is implemented on an ethernet interface card within the PC 32. However, it should be apparent to those skilled in the art that the interface circuit 228 can be implemented within the PC 32 in any other appropriate manner, including building the interface circuit onto the motherboard itself. The mass storage device 232 may include both fixed and removable media using any one or more of magnetic, optical or magneto-optical storage technology or any other available mass storage technology. The system bus 234 contains an address bus for addressing any portion of the memory 222 and 230. The system bus 234 also includes a data bus for transferring data between and among the CPU 220, the main memory 230, the video memory 222, the mass storage device 232 and the interface circuit 228.

The PC 32 is also coupled to a number of peripheral input and output devices including the keyboard 238, the mouse 240 and the associated display 212. The keyboard 238 is coupled to the CPU 220 for allowing a user to input data and control commands into the PC 32. A conventional mouse 240 is coupled to the keyboard 238 for manipulating graphic images on the display 212 as a cursor control device.

A port of the video memory 222 is coupled to a video multiplex and shifter circuit 224, which in turn is coupled to a video amplifier 226. The video amplifier 226 drives the display 212. The video multiplex and shifter circuitry 224 and the video amplifier 226 convert pixel data stored in the video memory 222 to raster signals suitable for use by the display 212.

Together, the ethernet switch 20 and the MHubs 30, 40, 50 and 60 allow both IEEE 1394-2000 devices and ethernet devices to coexist within the same network. The IEEE 1394-2000 devices are able to communicate with other devices in the network using both isochronous streams and asynchronous data packets. The ethernet devices are able to communicate with other devices in the network using standard asynchronous data packets. Preferably, if isochronous channels have been established, and there are currently isochronous streams within the network, the ethernet switch 20 sends a periodic isochronous start signal, herein referred to as an isotick signal. Alternatively, the isotick signal is always sent, regardless of whether or not there are currently isochronous streams within the network, allowing the isochronous clocks on all the MHubs to stay synchronized.

When the MHubs 30, 40, 50 and 60 receive this isotick signal, any of the MHubs 30, 40, 50 and 60 that have IEEE 1394-2000 isochronous data to send, will send the appropriate isochronous packets during this period. When the isochronous data has been sent for the current period, the ethernet switch 20, then notifies the MHubs 30, 40, 50 and 60 that the isochronous period is over. This allows the MHubs 30, 40, 50 and 60 to then send IEEE 1394-2000 asynchronous data packets and ethernet packets, until the next isotick signal is received. Preferably, the isotick signal is sent by the ethernet switch 20 every 125 microseconds, which corresponds to the cycle start signal of the IEEE 1394-2000 protocol.

Figure 8:
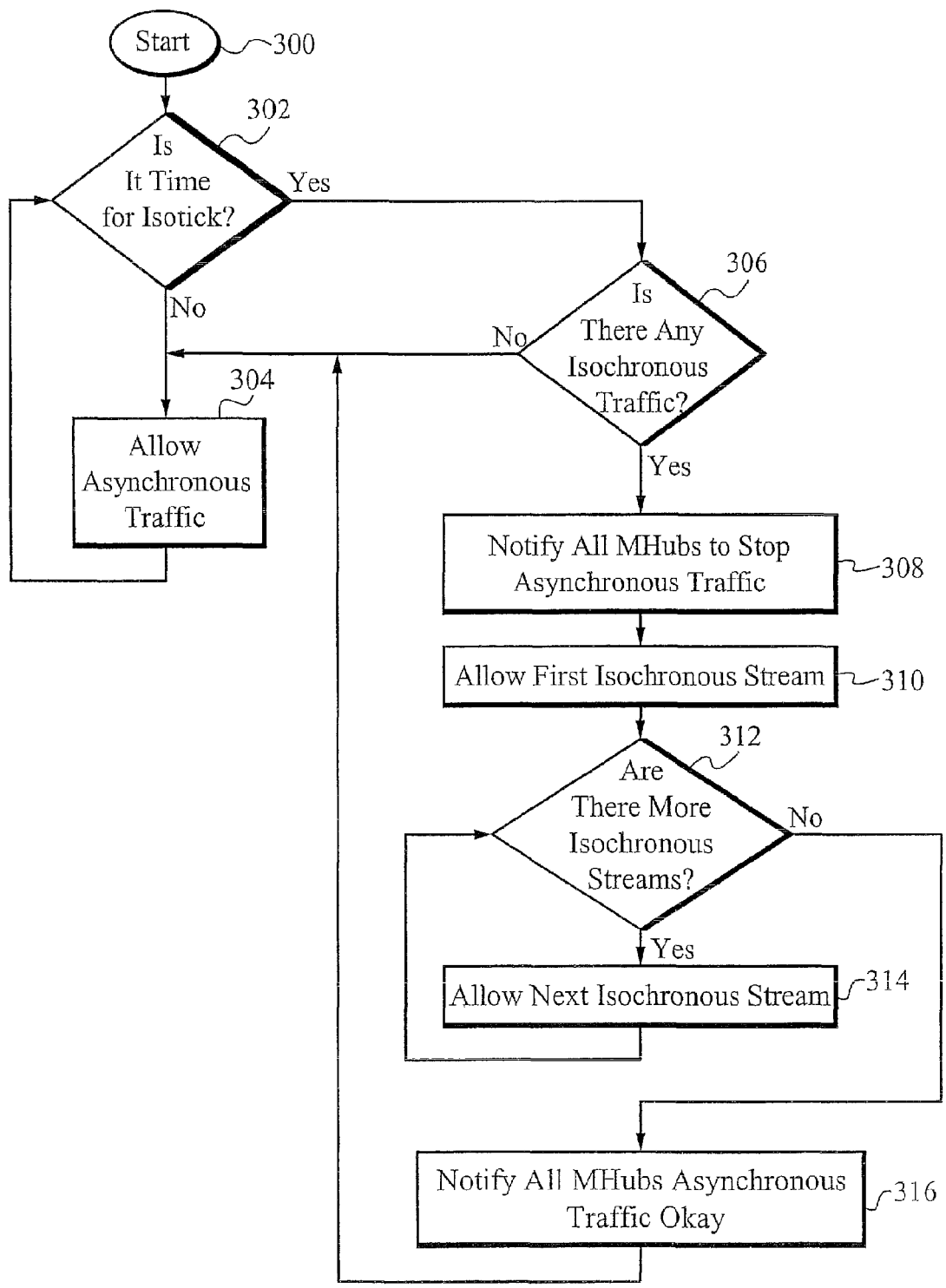
FIG. 8 illustrates a flowchart of the steps performed by the ethernet switch 20 of the preferred embodiment of the present invention, during operation.

A flowchart of the steps performed by the ethernet switch 20 of the preferred embodiment of the present invention, during its operation to manage the communications of data within the network, is illustrated in FIG. 8. The process performed by the ethernet switch 20 starts at the step 300. At the step 302 it is determined if it is time to send an isotick signal. If it is determined that is not yet time to send an isotick signal, then at the step 304, further asynchronous data packets are allowed, until it is determined at the step 302 that it is time to send an isotick signal. When it is determined at the step 302 that it is time to send the isotick signal, then it is determined, at the step 306, if there are any isochronous channels established and any current isochronous streams. If it is determined at the step 306 that there are no current isochronous streams, then the process jumps to the steps 304 and 302 and continues to allow asynchronous traffic until it is time to send the next isotick signal.

Otherwise, if it is determined at the step 306 that there are current isochronous streams, then all MHubs are notified to stop asynchronous traffic at the step 308. At the step 310, the first isochronous stream is then allowed on the network. It is then determined at the step 312 if there are more isochronous streams to send. If it is determined at the step 312 that there are more isochronous streams to send, then the next isochronous stream is allowed on the network, at the step 314. This continues until all isochronous streams have been sent. When it is determined at the step 312 that there are no more isochronous streams to send, then the ethernet switch notifies all MHubs that the isochronous interval is over and asynchronous traffic is now okay until the next isotick signal. The process then jumps to the steps 304 and 302 and continues to allow asynchronous traffic until it is time to send the next isotick signal.

Figure 9:
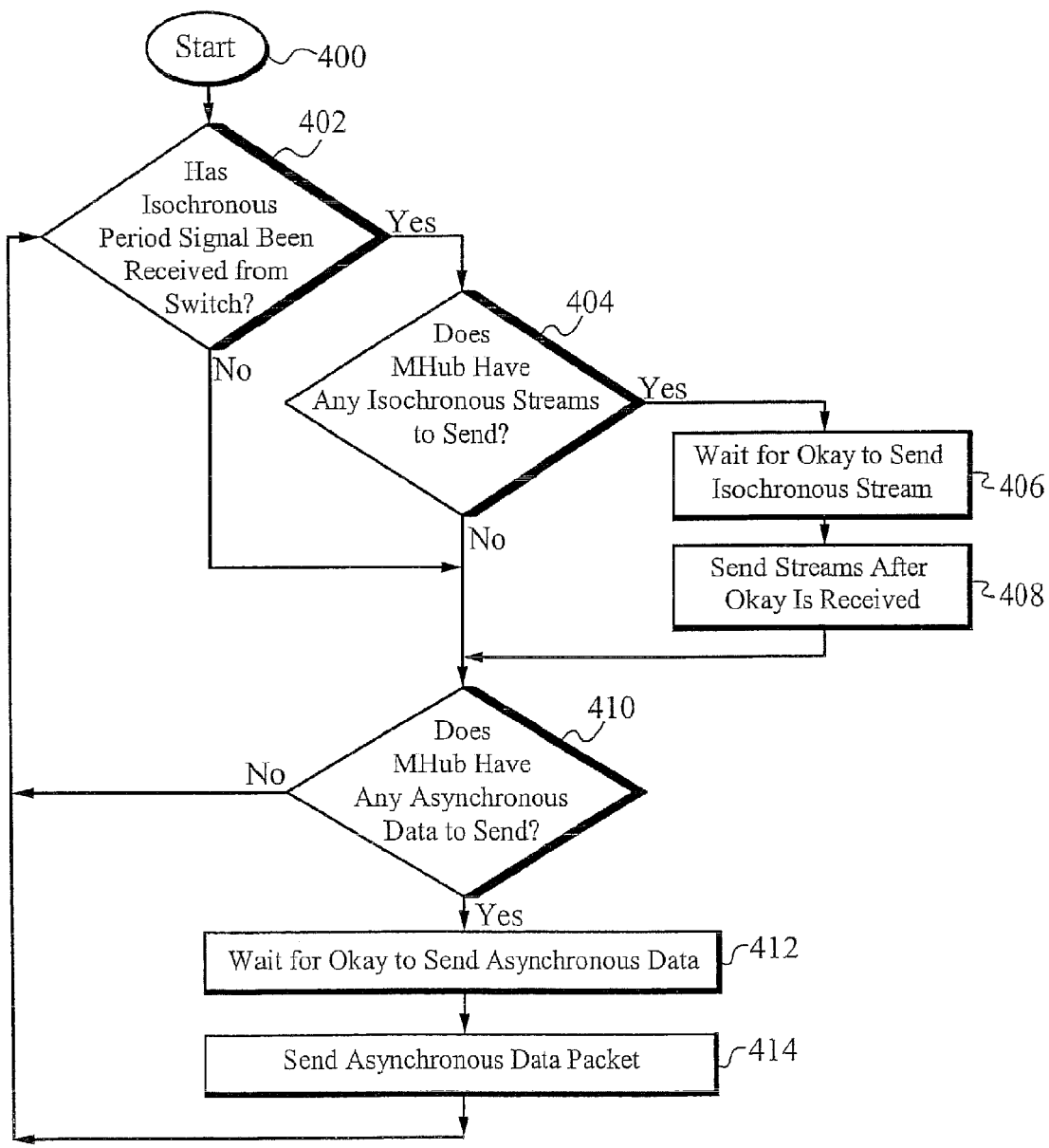
FIG. 9 illustrates a flowchart of the steps performed by the MHubs 30, 40, 50 and 60 of the preferred embodiment of the present invention, during operation.

A flowchart of the steps performed by each of the MHubs 30, 40, 50 and 60 of the preferred embodiment of the present invention, during operation, is illustrated in FIG. 9. The process performed by the MHubs starts at the step 400. The process determines at the step 402 if the isotick signal has been received from the ethernet switch. If it is determined at the step 402 that the isotick signal has not been received, then it is determined at the step 410, if the MHub has any asynchronous data to send, as will be discussed below. Once it is determined at the step 402 that the isotick signal has been received from the ethernet switch by the MHub, it is then determined, at the step 404, if the MHub currently has any isochronous streams to send. If it is determined at the step 404 that the MHub does have isochronous streams to send, then the MHub waits for the okay signal to send its isochronous stream, at the step 406. Once the MHub receives the okay signal to send its isochronous stream, the MHub then sends the isochronous streams that it has at the step 408. If it is determined at the step 404 that the MHub does not have any isochronous streams to send or after the MHub has sent its isochronous streams, at the step 408, it is then determined, at the step 410, if the MHub has any asynchronous data to send. If it is determined at the step 410 that the MHub does not have any asynchronous data to send then the process jumps back to the step 402 to determine if the next isotick signal has been received from the ethernet switch.

Otherwise, if it is determined at the step 410 that the MHub does have asynchronous data to send, then the MHub waits for the okay signal to send asynchronous data, at the step 412. Once the MHub receives the okay signal to send its asynchronous data, the MHub then sends the first asynchronous data packet that it has, at the step 414. The process then jumps back to the step 402 to determine if the next isotick signal has been received from the ethernet switch.

Figure 10:
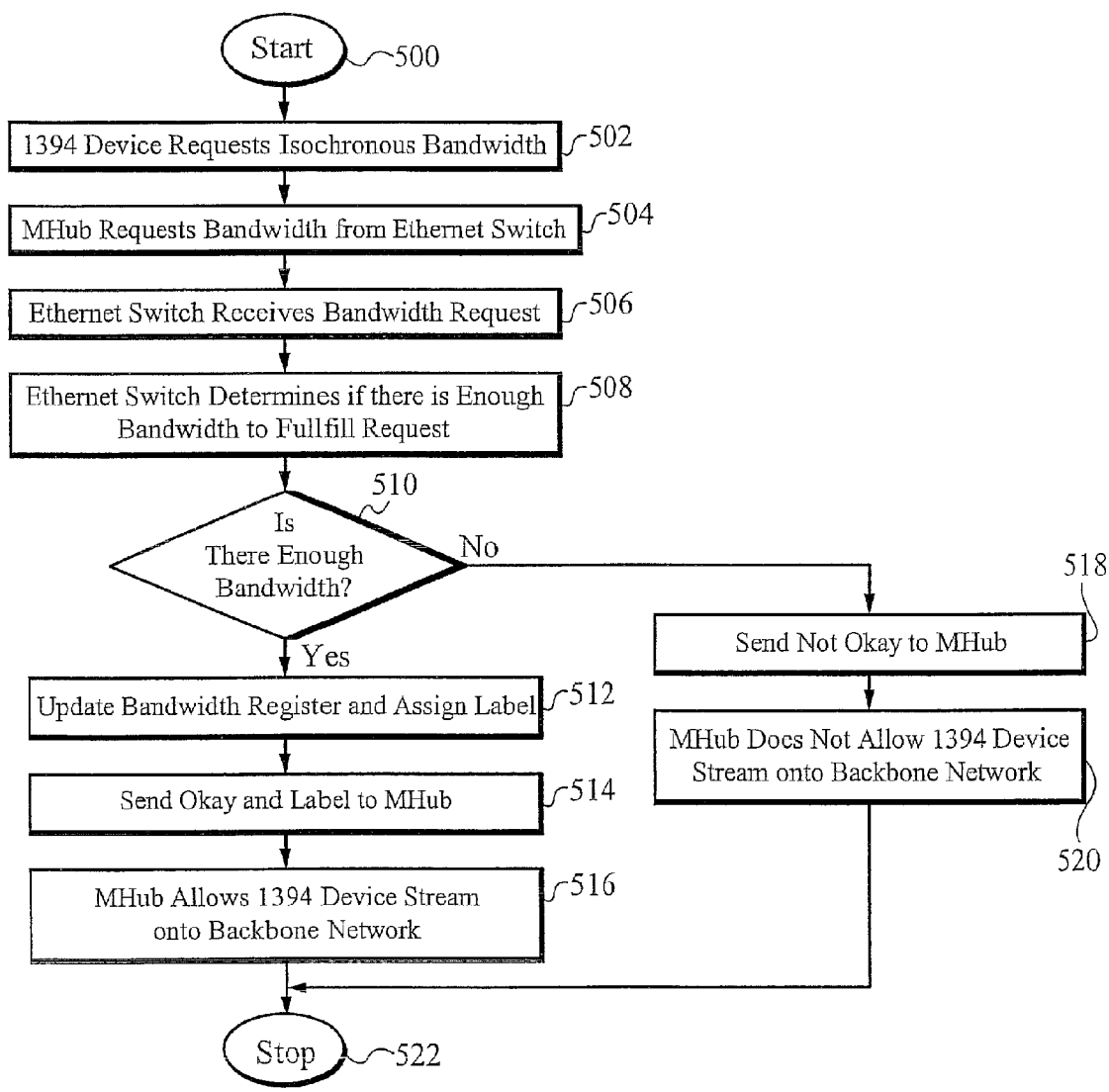
FIG. 10 illustrates a flowchart of the steps performed by the MHubs 30, 40, 50 and 60 and the ethernet switch 20, when negotiating for isochronous bandwidth and establishing an isochronous channel.

A flowchart of the steps performed by the MHubs 30, 40, 50 and 60 and the ethernet switch 20, when negotiating for isochronous bandwidth through the switch 20 and establishing an isochronous label, is illustrated in FIG. 10. The isochronous label corresponds to an isochronous channel and is established and maintained by the same device that is responsible for managing bandwidth. The process for negotiating for isochronous bandwidth and establishing an isochronous label starts at the step 500. At the step 502, an IEEE 1394-2000 device makes a request for isochronous bandwidth to the MHub to which it is coupled. At the step 504, the MHub that received the request for isochronous bandwidth, then makes a request for the isochronous bandwidth to the ethernet switch. At the step 506, the ethernet switch receives the bandwidth request from the MHub. The ethernet switch then determines, at the step 508, if there is enough remaining isochronous bandwidth to fulfill this request. To make this determination, the ethernet switch preferably compares the amount of bandwidth requested to a value representing an amount of available bandwidth. As new bandwidth is used on the network, the value representing the amount of available bandwidth is appropriately reduced. The value representing the amount of available bandwidth is preferably stored within an available bandwidth register. Alternatively, any other appropriate method of tracking available bandwidth is utilized, including utilizing a service within the network for tracking the amount of bandwidth being used and the amount of available bandwidth.

At the step 510, it is determined if there is enough isochronous bandwidth to fulfill the request. If it is determined at the step 510 that there is enough available isochronous bandwidth on the network to fulfill the request, then at the step 512, the available bandwidth register is updated to reduce the amount of bandwidth available on the network and the isochronous label is assigned. At the step 514, the requesting MHub is then notified that the bandwidth request has been approved, the requested isochronous bandwidth has been allocated and a label has been assigned. At the step 516, the MHub then allows the IEEE 1394-2000 isochronous device stream onto the backbone network, during the isochronous period. The process then ends at the step 522.

If it is determined at the step 510 that there is not enough available isochronous bandwidth on the network to fulfill the request, then at the step 518, the requesting MHub is notified that the bandwidth request has been denied. At the step 520, the MHub will not allow the IEEE 1394-2000 isochronous device stream onto the backbone network. The process then ends at the step 522. It should be understood that if there is not enough available isochronous bandwidth on the network to fulfill the request, that the isochronous stream can still be transmitted among the local devices, but not from the MHub to the ethernet switch.

As an example of the operation of the devices within the network of the preferred embodiment of the present invention, the initiation and operation of an isochronous transmission from the media server 54 to the stereo 34 will be described. To set up the isochronous transmission, one of the devices (in this example the media server 54) sends a request to its corresponding MHub 50 to allocate the necessary isochronous bandwidth for the transmission. The MHub 50 then sends a request to the ethernet switch 20 to allocate the necessary isochronous bandwidth for the transmission. As described above, the ethernet switch 20 then determines if the isochronous bandwidth is available on the network. The ethernet switch 20 then informs the MHub 50 whether or not the necessary bandwidth is available on the network and assigns a label to the isochronous transmission. If the necessary isochronous bandwidth is available, then the isochronous transmission is established between the media server 54 and the stereo 34 and the required isochronous bandwidth is reserved.

The media server 54 then sends the isochronous data to the MHub 50, where it is first stored in the isochronous memory 126. When the MHub 50 receives an isotick signal from the ethernet switch 20, the MHub 50 then sends the appropriate amount of isochronous data from the isochronous memory 126 to the ethernet switch 20. At the ethernet switch 20, the isochronous data is received at the port 162 and transmitted out of the port 158 to the MHub 30. The MHub 30 then receives the data from the ethernet switch 20 and forwards it to the stereo 34. This process is repeated at every isotick signal while this isochronous channel is active. Asynchronous data is transmitted between devices in the same manner during the asynchronous interval of each period.

The combined IEEE 1394-2000 and ethernet network of the preferred embodiment of the present invention allows devices on the network to operate according to both the IEEE 1394-2000 protocol and the ethernet protocol. It should be apparent to those skilled in the art, that alternatively, the present invention could also be utilized with other protocols, including the universal serial bus (USB) protocols and asynchronous transfer mode (ATM) protocols. It should also be apparent that in further alternate embodiments, the present invention could be utilized within a network operating according to more than two protocols. For example, the network could be configured to include devices operating according to the IEEE 1394-2000 protocol, the USB protocol and the ethernet protocol. In this alternate embodiment, the network could include multiple time-based protocols and multiple asynchronous protocols.

The devices within the network are able to send IEEE 1394-2000 isochronous data, IEEE 1394-2000 asynchronous data and ethernet data. As described above, both IEEE 1394-2000 devices and ethernet devices within the network are coupled to modified MHubs (MHubs) to form a local cluster. The MHubs are coupled to the ethernet switch which controls communications between devices in different local clusters. The ethernet switch and the MHubs obey an isochronous interval in which all isochronous data transfers will be allowed. On a regular and reoccurring period, the ethernet switch sends an isotick signal to begin the isochronous interval. Any bandwidth left after the isochronous interval is then allocated to the traditional ethernet traffic and the IEEE 1394-2000 asynchronous traffic, until the start of the next isochronous interval. Together, the MHubs and the ethernet switch allow both IEEE 1394-2000 devices and ethernet devices to coexist within the network. The IEEE 1394-2000 devices are able to communicate over the network using both isochronous streams and asynchronous data packets. The ethernet devices are able to communicate with other devices in the network using standard ethernet asynchronous data packets.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiment chosen for illustration without departing from the spirit and scope of the invention. Specifically, it will be apparent to one of ordinary skill that while the preferred embodiment of the present invention is used with a combined IEEE 1394-2000 serial bus and ethernet structure, the present invention could also be implemented on any other appropriate digital interfaces or bus structures, or with any other appropriate protocols, including other or later versions of the IEEE 1394 serial bus, other local area network protocols or device connection protocols, including current or later versions of the USB protocol and ATM protocol.

We claim:

1. A method of transmitting data within a network including one or more of a first type of device operating according to a first protocol and a second protocol and one or more of a second type of device operating according to only the second protocol, wherein devices of the first type and devices of the second type communicate with each other within the network, comprising:
   a. establishing a periodic cycle including a first portion and a second portion;
   b. allowing only transmissions according to the first protocol during the first portion;
   c. allowing only transmissions according to the second protocol during the second portion; and
   d. converting the transmissions of IEEE 1394-2000 packets to ethernet packets and the ethernet packets to the IEEE 1394-2000 packets when appropriate to be understood by a receiving device,
   wherein the first protocol has priority over the second protocol, and further wherein the second protocol is prioritized between a first set of traffic and a second set of traffic, wherein the first portion always precedes the second portion within each periodic cycle.

2. The method as claimed in claim 1 further comprising converting the transmissions into a format understood by a receiving device.

3. The method as claimed in claim 1 wherein a duration of the first portion is dependent on a summation of the duration of all active streams of the first protocol within the network.

4. The method as claimed in claim 1 further comprising establishing an active stream of the first protocol within the network and guaranteeing first protocol bandwidth to the active stream.

5. The method as claimed in claim 1 wherein the first type of device operates according to IEEE 1394 protocol and the second type of device operates according to ethernet protocol.

6. The method as claimed in claim 1 wherein the first protocol is isochronous capable and the second protocol is asynchronous.

7. The method according to claim 1 wherein giving priority to the first protocol over the second protocol comprises allowing all the transmissions of the first protocol to access the network before the transmissions of the second protocol at the beginning of each periodic cycle.

8. A modified hub device configured for coupling between two or more devices operating according to two or more different protocols and a switching device, wherein devices of the first type and devices of the second type communicate with each other, the hub device comprising:
   a. a first interface configured for coupling to and communicating with one or more of a first type of device operating according to a first protocol and a second protocol;
   b. a second interface configured for coupling to and communicating with one or more of a second type of device operating according to only the second protocol; and
   c. a third interface configured for coupling to and communicating with the switching device, wherein the switching device sends a periodic signal which signals the start of a period having a first portion and a second portion, wherein only communications in the first protocol are allowed during the first portion and only communications in the second protocol are allowed during the second portion, and further wherein the second protocol is prioritized between a first set of traffic and a second set of traffic.

9. The modified hub device as claimed in claim 8 further comprising a conversion circuit coupled to the first interface, the second interface and the third interface for converting transmissions into a format understood by a receiving device.

10. The modified hub device as claimed in claim 8 wherein a duration of the first portion is dependent on a summation of the duration of all active streams of the first protocol.

11. The modified hub device as claimed in claim 8 wherein the modified hub device communicates with the switching device to establish an active stream involving a device of the first type coupled to the hub device and further wherein appropriate bandwidth for the active stream is guaranteed when the active stream is established.

12. The modified hub device as claimed in claim 8 wherein the modified hub device communicates with the switching device to establish an active stream involving a device of the first type coupled to the hub device and to assign a label corresponding to the active stream.

13. The modified hub device as claimed in claim 8 wherein the first type of device operates according to IEEE 1394 protocol and the second type of device operates according to ethernet protocol.

14. The modified hub device as claimed in claim 8 wherein the first protocol is isochronous and the second protocol is asynchronous.

15. The modified hub device as claimed in claim 8 wherein communications from the first type of device in the second protocol are prioritized during the second portion over communications for the second type of device in the second protocol.

16. The modified hub device as claimed in claim 8 wherein communications from the second type of device in the second protocol are prioritized during the second portion over communications from the first type of device in the second protocol.

17. The modified hub device as claimed in claim 8 wherein the switching device is configured for coupling to a remote network of devices thereby providing a wide area network.

18. A switching device configured for coupling to two or more hub devices providing interfaces to one or more of a first type of device operating according to a first protocol and a second protocol and one or more of a second type of device operating according to only the second protocol, the switching device comprising:
   a. a plurality of ports, each port coupled to a corresponding hub device for interfacing with devices coupled to the corresponding hub device; and
   b. a control circuit coupled to the plurality of ports for sending a periodic signal which signals the start of a period having a first portion and a second portion,
   wherein only communications in the first protocol are allowed during the first portion and only communications in the second protocol are allowed during the second portion,
   wherein the first protocol has priority over the second protocol, and further wherein the second protocol is prioritized between a first set of traffic and a second set of traffic.

19. The switching device as claimed in claim 18 wherein devices of the first type and devices of the second type communicate with each other.

20. The switching device as claimed in claim 18 wherein a duration of the first portion is dependent on a summation of the duration of all active streams of the first protocol.

21. The switching device as claimed in claim 18 wherein the switching device communicates with the hub devices to establish an active stream involving a device of the first type and further wherein appropriate bandwidth for the active stream is guaranteed when the active stream is established.

22. The switching device as claimed in claim 18 wherein the switching device communicates with the hub devices to establish an active stream involving a device of the first type and to assign a label corresponding to the active stream.

23. The switching device as claimed in claim 18 wherein the first type of device operates according to IEEE 1394 protocol and the second type of device operates according to ethernet protocol.

24. The switching device as claimed in claim 18 wherein the first protocol is isochronous capable and the second protocol is asynchronous.

25. The switching device as claimed in claim 18 wherein communications from the first type of device in the second protocol are prioritized during the second portion over communications from the second type of device in the second protocol.

26. The switching device as claimed in claim 18 wherein communications from the second type of device in the second protocol are prioritized during the second portion over communications from the first type of device in the second protocol.

27. The switching device as claimed in claim 18 further comprising a remote interface circuit configured for coupling to a remote network of devices thereby providing a wide area network.

28. A network of devices comprising:
   a. a switching device including:
      i. a plurality of ports; and
      ii. a control circuit coupled to the plurality of ports for sending a periodic signal which signals the start of a period having a first portion and a second portion, wherein only communications in a first protocol are allowed during the first portion and only communications in a second protocol are allowed during the second portion; and
   b. a plurality of modified hub devices each including:
      i. a first interface configured for coupling to and communicating with one or more of a first type of device operating according to the first protocol and the second protocol;
      ii. a second interface configured for coupling to and communicating with one or more of a second type of device operating according to only the second protocol, wherein the first protocol has priority over the second protocol; and
      iii. a third interface coupled to a corresponding one of the plurality of ports, and wherein the second protocol is prioritized between a first set of traffic and a second set of traffic.

29. The network of devices as claimed in claim 28 wherein devices of the first type and devices of the second type communicate with each other.

30. The network of devices as claimed in claim 29 wherein each of the modified hub devices further comprise a conversion circuit coupled to the first interface, the second interface and the third interface for converting transmissions into a format understood by a receiving device.

31. The network of devices as claimed in claim 28 wherein a duration of the first portion is dependent on a summation of the duration of all active streams of the first protocol.

32. The network of devices as claimed in claim 28 wherein each of the modified hub devices communicate with the switching device to establish an active stream involving a device of the first type coupled to the hub device and further wherein appropriate bandwidth for the active stream is guaranteed when the active stream is established.

33. The network of devices as claimed in claim 28 wherein each of the modified hub devices communicate with the switching device to establish an active stream involving a device of the first type coupled to the hub device and to assign a label corresponding to the active stream.

34. The network of devices as claimed in claim 28 wherein the first type of device operates according to IEEE 1394 protocol and the second type of device operates according to ethernet protocol.

35. The network of devices as claimed in claim 28 wherein the first protocol is isochronous capable and the second protocol is asynchronous.

36. The network of devices as claimed in claim 28 wherein communications from the first type of device in the second protocol are prioritized during the second portion over communications from the second type of device in the second protocol.

37. The network of devices as claimed in claim 28 wherein communications from the second type of device in the second protocol are prioritized during the second portion over communications from the first type of device in the second protocol.

38. The network of devices as claimed in claim 28 wherein the switching device further comprises a remote interface circuit configured for coupling to a remote network of devices thereby providing a wide area network.

39. A method of transmitting data within a network including one or more of a first type of device operating according to an isochronous protocol and an asynchronous protocol and one or more of a second type of device operating according to only the asynchronous protocol, wherein devices of the first type and devices of the second type communicate with each other within the network, comprising:
   a. establishing a periodic cycle including a first portion and a second portion;
   b. allowing only transmissions according to the isochronous protocol during the first portion; and
   c. allowing only transmissions according to the asynchronous protocol during the second portion,
   wherein the isochronous protocol has priority over the asynchronous protocol, and further wherein the asynchronous protocol is prioritized between a first set of traffic and a second set of traffic.

40. The method as claimed in claim 39 wherein the first type of device operates according to IEEE 1394 protocol and the second type of device operates according to ethernet protocol.

41. A network of devices comprising:
   a. a switching device including:
      i. a plurality of ports; and
      ii. a control circuit coupled to the plurality of ports for sending a periodic signal which signals the start of a period having a first portion and a second portion, wherein only communications in an isochronous protocol are allowed during the first portion and only communications in an asynchronous protocol are allowed during the second portion; and
   b. a plurality of modified hub devices each including:
      i. a first interface configured for coupling to and communicating with one or more of a first type of device operating according to the isochronous protocol and the asynchronous protocol;

ii. a second interface configured for coupling to and communicating with one or more of a second type of device operating according to only the asynchronous protocol, wherein the isochronous protocol has priority over the asynchronous protocol; and iii. a third interface coupled to a corresponding one of the plurality of ports and further wherein the asynchronous protocol is prioritized between a first set of traffic and a second set of traffic.

42. The network of devices as claimed in claim 41 wherein the first type of device operates according to IEEE 1394 protocol and the second type of device operates according to ethernet protocol.

43. A method of transmitting data within a network including one or more of a first type of device operating according to an isochronous protocol and an asynchronous protocol and one or more of a second type of device operating according to only the asynchronous protocol, wherein devices of the first type and devices of the second type communicate with each other within the network, comprising:

a. establishing a periodic cycle including a first portion and a second portion;

b. allowing only transmissions according to the isochronous protocol during the first portion; and c. allowing only transmissions according to the asynchronous protocol during the second portion, wherein the isochronous protocol has priority over the asynchronous protocol, and further wherein the asynchronous protocol is prioritized between IEEE 1394-2000 asynchronous traffic and ethernet traffic.

44. A method of transmitting data within a network including one or more of a first type of device operating according to an isochronous protocol and an asynchronous protocol and one or more of a second type of device operating according to only the asynchronous protocol, wherein devices of the first type and devices of the second type communicate with each other within the network, comprising:

a. establishing a periodic cycle including a first portion and a second portion;

b. allowing only transmissions according to the isochronous protocol and time critical ethernet traffic during the first portion; and c. allowing only transmissions according to the asynchronous protocol during the second portion, wherein the isochronous protocol and time critical ethernet traffic has priority over the asynchronous protocol and further wherein the asynchronous protocol is prioritized between a first set of traffic and a second set of traffic.

\* \* \* \* \*